Patented Nov. 8, 1938

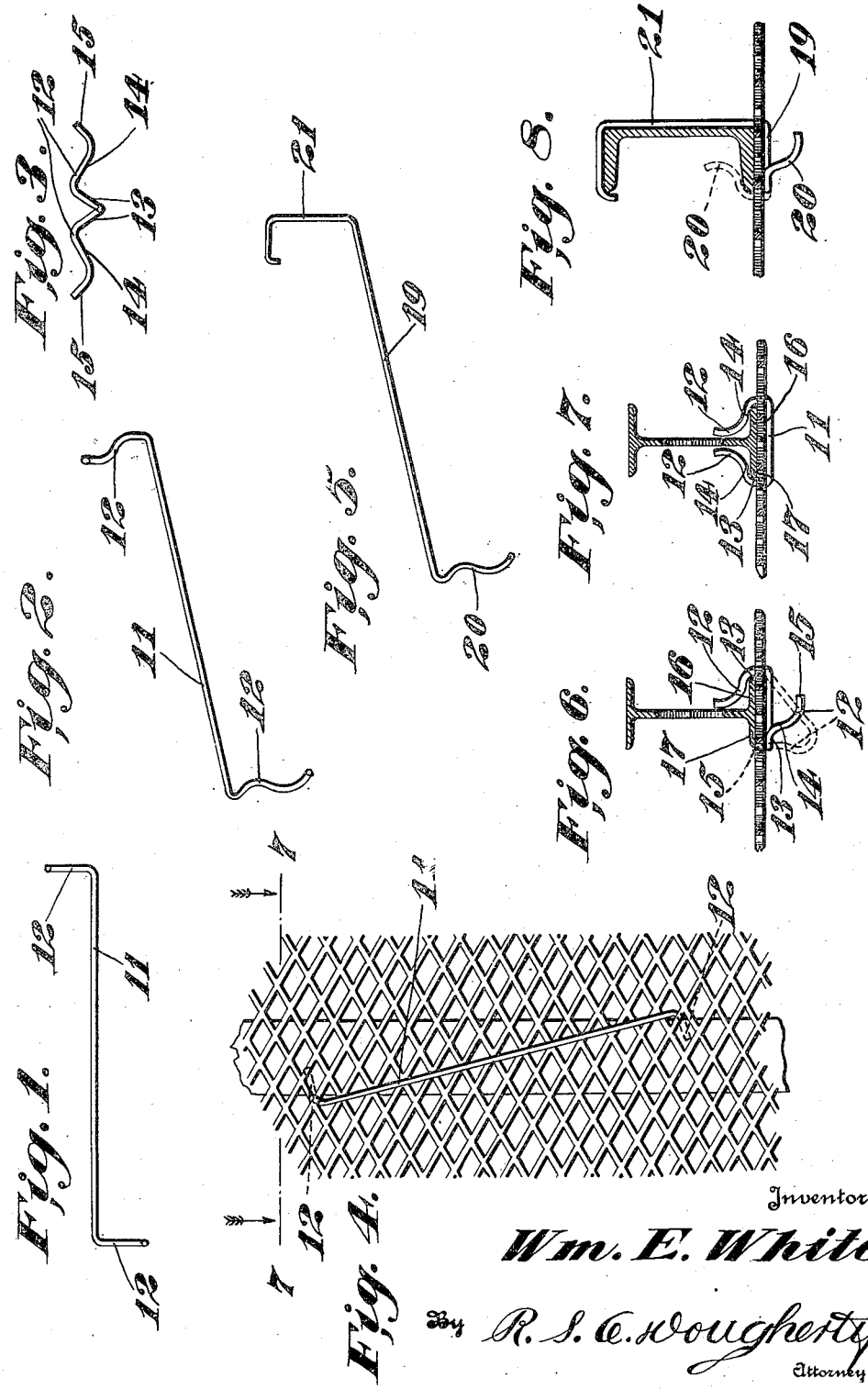

2,135,686

UNITED STATES PATENT OFFICE 2,135,686

CLIP

William E. White, Bethlehem, Pa., assignor to Bethlehem Steel Company, a corporation of Pennsylvania Application August 14, 1937, Serial No. 159,099

6 Claims. (Cl. 72—120)

My invention relates to clips for securing metal lath to steel joists or other supports.

Heretofore, metal lath has usually been attached to furring member by means of short lengths of wire looped around said members and the metal lath, the ends of each length of wire being twisted together. Wires so twisted, however, form a fragile, easily broken, fastening. Various clips have been devised, consisting of lengths of wire having hooked ends which are inserted through the interstices in the lath and are engaged about the flanges or edges of the furring members. Such clips, however, are usually unsatisfactory, and provide a rather insecure fastenning means. In general, they must be made with extreme accuracy if they are to function as fastening members. Moreover, they are usually difficult to apply.

An object of my invention is to provide a clip for metal lath which will hold such lath securely against a furring member under all conditions which are met in practice.

Another object of my invention is to provide a lath clip which is extremely easy to apply.

Another object of my invention is to provide a lath clip which, because it is capable of compensating for minor inaccuracies in its dimensions, is inexpensive to manufacture.

Still other objects of my invention will appear from the following drawing and detailed specification:

In the drawing, which illustrates the preferred embodiment of my invention,

Fig. 1 is a top view of the device;

Fig. 2 is a view of the device in perspective;

Fig. 3 is an end view of the device;

Fig. 4 is a view of the device installed in connection with a furring member of I section;

Fig. 5 is a perspective view of a modified form of the device;

Fig. 6 is a sectional view showing the device during installation on a furring member of I section;

Fig. 7 is a sectional view taken along line 7—7 of Fig. 4; and

Fig. 8 is a sectional view of the modified form of the device shown in Fig. 5 as applied to a furring member of channel section.

Referring more particularly to the drawing, Fig. 1 shows the clip consisting of a piece of wire, preferably of spring steel. The body portion 11 may be of any convenient length, but I find a length of approximately six inches to be satisfactory for the structure shown. At each end of the body portion 11, disposed at approximately a right angle thereto, and in opposite directions to each other, are hooks 12.

The conformation of the hooks 12 is clearly shown in Fig. 3. As will be seen by reference to said figure, each hook consists of a portion 13 having a length approximately equal to the combined thickness of the metal lath and the flange of the furring member to which the lath is to be secured. Disposed at approximately right angles to the portions 13, but in the same plane, is the portion 14 which engages the flange of the furring member. The portion 14 preferably terminates in another portion 15 which is approximately at a right angle to the portion 14, and in the same plane.

It will be noted in Figure 3 that the portions 13 disposed at each end of the clip are located in different planes. I prefer to form these hooks approximately 90° apart as shown in Figure 3, but this angle may be varied considerably without departing from the spirit of my invention.

Figure 4 shows the clip in operative engagement with a section of metal lath and a furring member. As will be seen by reference to this figure, the body portion 11 of the clip rests upon the lath, in a diagonal position with reference to the furring member, while the hooks 12 are inserted through interstices in the lath and engage the under surfaces of the flange of the furring member.

The method of attaching the clip is shown in Fig. 6. As illustrated in said figure, one of the hooks 12 is inserted through a convenient interstice in the lath and is engaged against the flange 16 of the furring member. It will be seen that by reason of the fact that the portions 13 of the hooks 12 lie in different planes, the unengaged hook 12 is located out of contact with the furring member. To complete the attaching of the clip, the unengaged hook 12 is grasped by a pair of pliers or other suitable means and turned through an arc until the end portion 15 is in position to be inserted through one of the interstices in the metal lath adjacent the furring member as shown in dotted lines in Fig. 6. This manipulation resiliently distorts the clip. After the hook has been so inserted, it is manipulated so that the portion 14 of the hook 12 will pass into engagement with the flange 17 of the furring member as shown in Fig. 7, while the clip is in its distorted condition thereby causing the clip to resiliently engage the flange of the furring member effectively due to the tendency of the clip to resume its original condition.

As stated above, when the clip is twisted through the medium of the unengaged hook 12, the clip itself is placed under torsion, and as a result thereof the portions of the hooks 12 firmly engage the flange portions 16 and 17 of the furring member. It is this element of torsional resilience which is established in the clip when placed in operative position which constitutes the principal novelty and utility of my device.

It is also apparent that for the above reasons, the hooks 12 of my clip need not be made with the extreme accuracy of dimensions which the clips of the prior art require, since the torsional resilience of the clip when placed in operative position will cause it to grip the furring member strongly in spite of irregularities in the dimensions of the hooks 12.

In Figures 5 and 8 is shown a modified clip embodying my invention which is particularly adapted to be used with a furring member of channel shape. This clip consists of a body portion 19 and a hook 20 which are similar to the body portion 11 and the hooks 12, respectively, of the clip shown in Figs. 1 to 4 and 6 and 7 and a hook 21, which is particularly adapted to engage a channel section. The hooks 20 and 21 are disposed at right angles to the body portion and in different planes. This clip is assembled by placing the hook 21 in engagement with the channel member as shown in full line in Fig. 8 and rotating the hook 20 in the same manner as the hook 12 of the clip, as shown in Fig. 6, until the end of the hook 20 passes the edge of the flange of the channel and then pushing the body portion 19 upwardly until the hook 20 passes into engagement with the flange as shown in dotted lines in Fig. 8. As will be seen from Figure 8, when this clip is placed in operative position the hooks 20 and 21 will, by reason of the torsional resilience of the clip, firmly grasp the furring member.

Although I have illustrated and described my invention as being used in connection with metal lath, I do not wish to be limited thereby, since my clip will operate in the same manner when used with paper backed mesh lath or similar material.

While I have shown my invention in a plurality of forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. A clip of the class described formed of resilient material, consisting of a body portion, and end portions comprising continuations of the body portion and disposed at approximately right angles to the body portion and at an angle to each other, each end portion being further bent to provide a hook capable of engaging the flange of a furring member.

2. A clip of the class described comprising a resilient body portion and portions at each end thereof comprising continuations of the body portion and disposed at right angles thereto and in different planes with respect to each other, each of said end portions being bent so as to provide a hook capable of engaging a furring member.

3. A clip of the class described comprising a resilient body portion, a hook at one end thereof comprising a continuation of the body portion and disposed at substantially a right angle to said body portion and so formed as to be capable of engaging a flange of a furring member, and a hook at the other end thereof comprising a continuation of the body portion and disposed at substantially a right angle to said body portion and at an angle to the other hook and so formed as to be capable of engaging another flange of a furring member.

4. A clip of the class described comprising a resilient body portion and an S-shaped leg at each end thereof comprising a continuation of the body portion, said legs being disposed at substantially a right angle to the body portion and extending at an angle to each other.

5. A clip of the class described comprising a resilient body portion and an L-shaped leg at each end thereof comprising a continuation of the body portion, said legs being disposed at substantially a right angle to the body portion and extending at an angle to each other.

6. A clip comprising a resilient body portion and end portions comprising continuations thereof and disposed at angles thereto and normally in different planes with respect to each other, said clip during its assembly with the flange of a furring element adapted to be resiliently distorted by rotating one end thereof so that the end portions adjacent the body of the clip are substantially in the same plane when the clip is in its assembled condition.

WILLIAM E. WHITE.